No. 762,356. PATENTED JUNE 14, 1904.
W. R. SMITH.
APPARATUS FOR TREATING TEXTILE FABRICS IN THE MANUFACTURE OF BELTING.
APPLICATION FILED JUNE 29, 1903.
NO MODEL. 6 SHEETS—SHEET 1.

No. 762,356. PATENTED JUNE 14, 1904.
W. R. SMITH.
APPARATUS FOR TREATING TEXTILE FABRICS IN THE MANUFACTURE OF BELTING.
APPLICATION FILED JUNE 29, 1903.
NO MODEL. 6 SHEETS—SHEET 4.

No. 762,356. PATENTED JUNE 14, 1904.
W. R. SMITH.
APPARATUS FOR TREATING TEXTILE FABRICS IN THE MANUFACTURE OF BELTING.
APPLICATION FILED JUNE 29, 1903.
NO MODEL. 6 SHEETS—SHEET 5.

Witnesses:
J. P. Ide.
A. D. Harrison

Inventor:
W. R. Smith

No. 762,356.

Patented June 14, 1904.

UNITED STATES PATENT OFFICE.

WILLIAM R. SMITH, OF BUFFALO, NEW YORK, ASSIGNOR TO BUFFALO WEAVING AND BELTING COMPANY, OF BUFFALO, NEW YORK, A CORPORATION OF NEW YORK.

APPARATUS FOR TREATING TEXTILE FABRICS IN THE MANUFACTURE OF BELTING.

SPECIFICATION forming part of Letters Patent No. 762,356, dated June 14, 1904.

Application filed June 29, 1903. Serial No. 163,511. (No model.)

*To all whom it may concern:*

Be it known that I, WILLIAM R. SMITH, of Buffalo, in the county of Erie and State of New York, have invented certain new and useful Improvements in Apparatus for Treating Textile Fabrics in the Manufacture of Belting, of which the following is a specification.

This invention relates to the treatment of multiple-ply woven fabrics the threads of which are of textile material, such as cotton, the fabric being made in an elongated strip of indeterminate length of suitable dimensions for machine-belting.

The invention has for its object to provide an improved apparatus for producing a fabric of this character which shall be inextensible longitudinally or in the direction of length of the warp-thread and free from liability to be affected by atmospheric conditions, so that the fabric when embodied in a machine-belt will neither stretch nor shrink under the ordinary conditions of service to which it is subjected.

The invention also has for its object to enable the threads of a multiple-ply woven fabric to be permeated or saturated with an adhesive composition applied in a fluid or semifluid condition, to the end, first, that the individual fibers of each thread may be caused to cohere, and thus produce an increased degree of tensile strength similar to that imparted to the well-known thread termed a "waxed end" by the application of wax thereto, and, secondly, that the surface of a belt composed of threads thus treated may possess to a sufficient degree the quality of adhering to the peripheries of the wheels or pulleys over which it passes, this quality being unaffected by the wearing away of the surface of the fibers of the threads, because of the saturation of the threads with the adhesive composition.

The chief object of my invention is to enable the threads of a multiple-ply woven fabric to be permeated or saturated with a fluid or semifluid composition containing rubber, the composition being of such character that it can be cured or vulcanized within the threads by heating, thus producing a belt of great durability and well adapted to take a sufficient frictional hold on pulleys.

Prior to my invention, so far as I am aware, a multiple-ply woven fabric of textile material has never had its threads uniformly saturated with an adhesive composition applied in a fluid or semifluid condition. So far as I am aware, it has been heretofore considered impossible to force a fluid or semifluid adhesive composition, and particularly one containing rubber or its equivalent, into the threads of a multiple-ply woven fabric, owing to the fact that the warp and weft threads of a multiple-ply fabric are so closely interwoven that it has been impossible by any methods heretofore known to force a composition of the character stated into the warp and weft threads in such manner as to permeate the same. I have discovered that by heating a fabric of this character, and thus thoroughly expelling all moisture therefrom and putting its fibers in a receptive condition, and by stretching the fabric lengthwise or in the direction of its warp-threads while it is heated the physical conditions of the fabric are so changed that an adhesive composition in a fluid or semifluid condition can be readily forced while in a heated condition into the pores between the threads of the fabric and into the minute crevices between the fibers of the threads, heat and pressure being employed conjointly to force the said composition into the fabric. I have also found that a fabric thus treated possesses certain new characteristics particularly adapting it for machine-belting, said characteristics being entire freedom from liability to shrink, resistance to the varying conditions of the atmosphere as to moisture, and adaptability to cling or take an effective frictional hold upon the periphery of a pulley, this adaptability being unaffected by the wearing away of the surface fibers of the fabric.

A machine-belt made of multiple-ply woven fabric treated in accordance with my invention has all the desirable qualities of the ordinary so-called "rubber" belting composed of alternate layers of textile fabric and rubber without possessing the chief disadvantage of ordinary rubber belting—viz., the liability of the layers of the belting to separate, this liability, as is well known, often causing the disintegration and materially impairing the durability of an ordinary laminated cloth and rubber belt.

A multiple-ply woven-fabric belt is not laminated, but is practically homogeneous in its structure, so that when treated in accordance with my invention with an adhesive composition which permeates its pores and saturates its threads a belting fabric is produced which is practically waterproof and adapted to take an effective frictional hold on a pulley and is at the same time free from liability to separate into thin strips or shreds, its wear being due to the gradual removal of the surface fibers. This removal being gradual has no effect analogous to that of the splitting away or removal of a surface layer in a combined cloth and rubber belt.

The invention consists in the improvements in the apparatus for producing a fabric having the characteristics above described, all as hereinafter described and claimed.

Of the accompanying drawings, forming a part of this specification.

The same reference characters indicate the same parts in all the figures.

Figure 3:
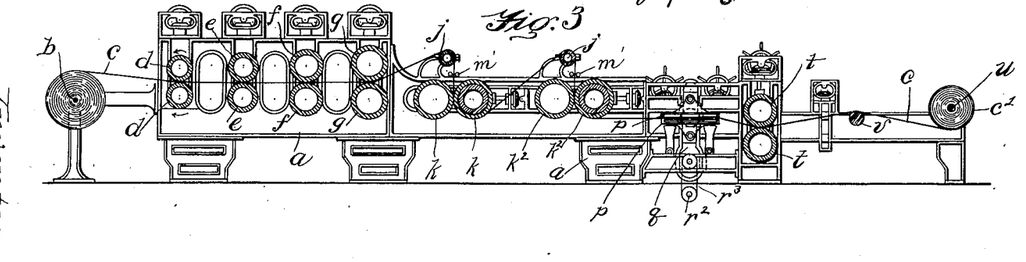
Fig. 3 represents a longitudinal section on line 3 3 of Fig. 1.

In the drawings, $a$ represents the supporting-frame of my improved machine, the same being of any suitable form and construction. At one end of the supporting-frame is mounted a delivering reel or mandrel $b$, on which is wound a strip $c$ of multiple-ply woven fabric of indeterminate length, the threads of said fabric being preferably composed of cotton, although a fabric of any other suitable textile material may be treated in accordance with my invention hereinafter described. The reel or mandrel $b$ is preferably provided near one end with a flange $b'$ to guide one edge of the roll or strip of fabric, and its rotation is preferably retarded by a friction device or brake $b^2$, comprising a shoe hinged at one end and formed to fit the periphery of a V-shaped pulley $b^3$, affixed to one end of the reel $b$, the shoe being pressed against said pulley by an adjusting-screw $b^4$. From the reel or mandrel $b$ the strip $c$ passes between two pressure-rolls $d\ d$, journaled in bearings supported by the frame of the machine, said rolls being rotated in the directions indicated by the arrows in Fig. 3 and being arranged so that they closely grasp or nip the fabric and draw it from the reel $b$.

Figure 1:
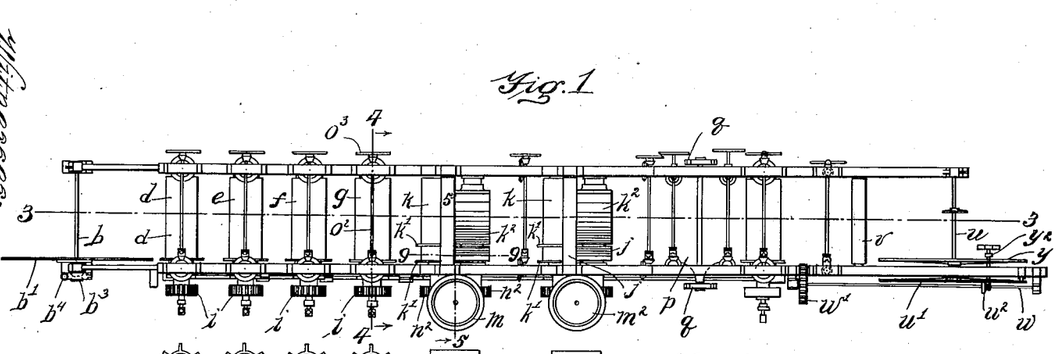
Figure 1 represents a plan view of a fabric-treating machine embodying my invention.
Figure 2:
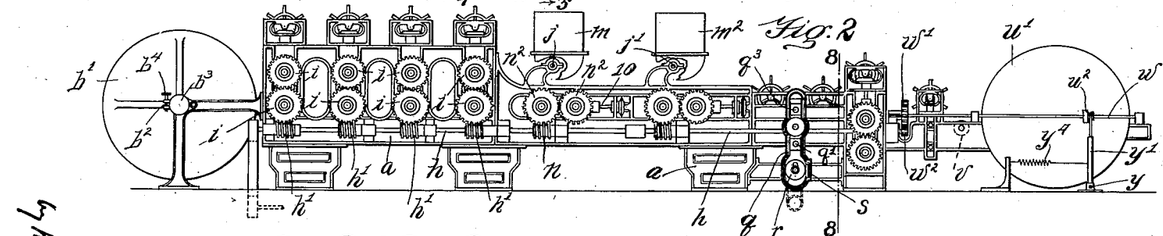
Fig. 2 represents a side elevation of the same.
Figures 4, 5, 6, 7:
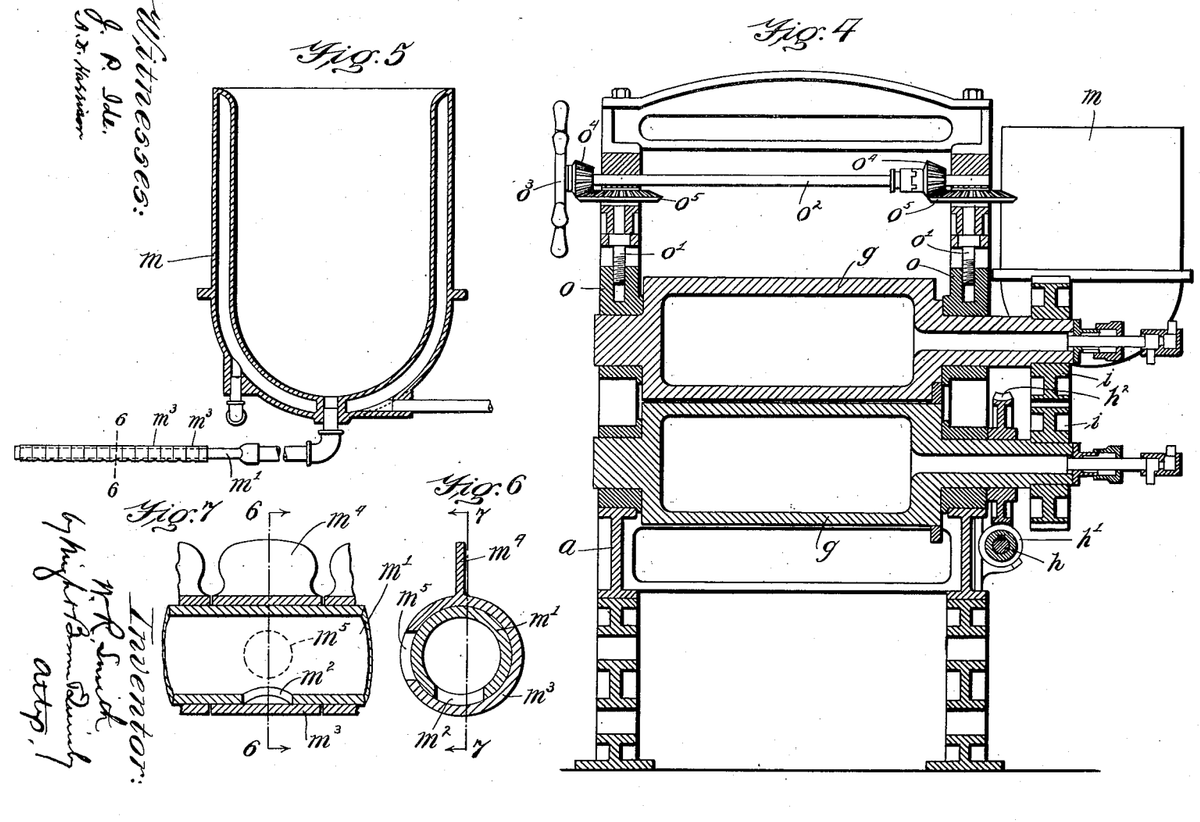
Fig. 4 represents a transverse section on line 4 4 of Fig. 1.
Fig. 5 represents a transverse section on line 5 5 of Fig. 1.
Fig. 6 represents a transverse section on line 6 6 of Fig. 5.
Fig. 7 represents a section on line 7 7 of Fig. 6.
Figure 10:
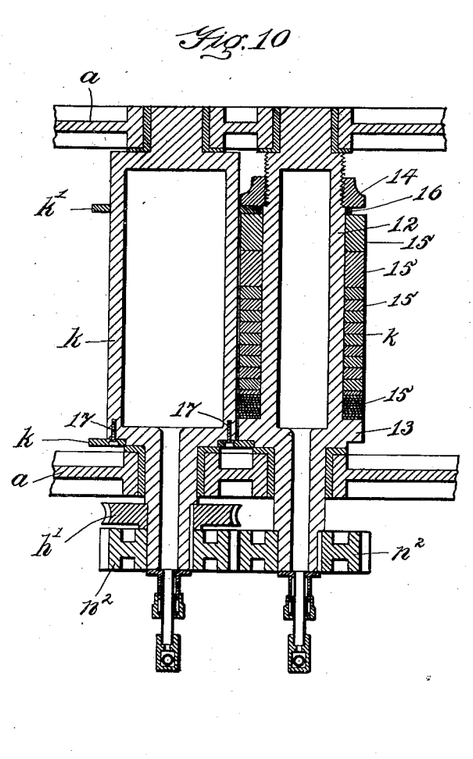
Fig. 10 represents a section on line 10 10 of Fig. 2.

$e\ e, f\ f$, and $g\ g$ represent additional pairs of rolls, each mounted and driven like the rolls $d\ d$ and each grasping and moving forward the strip of fabric $c$. Each of the above-described rolls is heated, preferably by steam introduced into its interior, the rolls being hollow and each provided at one end with a tubular trunnion, which receives the heating agent through a suitable supply-pipe, all as indicated in Fig. 4. The rolls therefore act to heat and dry the fabric, so that when the strip has passed between the last pair of rolls $g\ g$ it is in a thoroughly dry condition. The lower roll of each pair is rotated by means of a shaft $h$, having a series of worms $h'$, meshing with worm-gears $h^2$, affixed to the trunnions of the lower rolls $d\ e\ f\ g$, and by means of intermeshing gears $i\ i$, affixed to the trunnions of the upper and lower rolls. The rolls $e\ e$ have a surface velocity slightly exceeding that of the rolls $d\ d$, and each succeeding pair of rolls has a surface velocity slightly exceeding that of the pair preceding it, the result being that the strip $c$ is stretched in its passage from each pair of rolls to the next. From the last pair of rolls $g\ g$ the strip $c$ passes over an idle guide-roll $j$, between a pair of rolls $k\ k$, which are arranged side by side, their axes being at substantially the same height, so that the peripheries of the rolls above their line of nip form the sides of a substantially V-shaped trough, through which a stretch of the strip $c$ passes vertically. One of the rolls $k$ is provided with flanges $k'\ k'$, which project beyond or overlap portions of the other roll $k$ and form the ends of the above-mentioned trough. The sides and ends of the trough thus formed are adapted to confine in contact with the strip a quantity of fluid or semifluid filling composition, which is of an adhesive and waterproof nature and is preferably a solution of rubber. Said composition is supplied to the trough from a kettle or reservoir $m$, located at one side of the machine at a higher level than the trough. The said kettle is heated, preferably, by a steam-jacket and is provided with outlet-pipes $m'\ m'$, arranged to deliver the composition to the said trough at opposite sides of the stretch of fabric passing through the trough. The rolls $k\ k$ have a surface velocity slightly greater than that of the rolls $g\ g$, so that they maintain and slightly increase the stretch imparted to the fabric, as above described, the said rolls $k\ k$ being arranged to tightly grasp or nip the fabric, and thus not only stretch and feed the same forward, but also force into its stretched and heated fibers and pores the composition supplied by the kettle $m$. The rolls $k\ k$ are heated in the same manner as the preceding rolls and are rotated by means of a worm $n$ on the shaft $h$, a worm-gear $n'$, affixed to the trunnion of one of the rolls $k$, and intermeshing gears $n^2\ n^2$, affixed to the shafts or trunnions of the rolls $k\ k$. I prefer to provide a second pair of rolls $k^2\ k^2$, which are duplicates of the rolls $k\ k$ and are supplied with a heated composition from a heated kettle or reservoir $m^2$, the strip $c$ passing from the rolls $k\ k$ over an idle guide-roll $j'$, between the rolls $k^2\ k^2$, where it receives an additional charge of the filling composition. The rolls $k^2\ k^2$ are preferably driven at a surface velocity somewhat exceeding that of the rolls $k\ k$, so that they maintain and slightly increase the stretch previously imparted to the fabric. My invention is not limited, however, to the employment of two sets of devices for applying the composition to the fabric, and I may employ either one set of said devices or any larger number, according to the thickness of the fabric and the depth to which it is desired that the composition shall penetrate the fabric. One member of each of the described pairs of heated rolls is preferably adjustable toward and from the other to accommodate the rolls to the thickness of the fabric, the adjustable roll, which in the construction shown in Fig. 4 is the upper roll, being journaled in movable boxes or bearings $o\ o$, which are movable in guides in the supporting-frame and are adjusted by adjusting-screws $o'\ o'$, operated simultaneously by a shaft $o^2$, journaled in the supporting-frame and having a hand-wheel $o^3$, said shaft being provided with bevel-pinions $o^4$, meshing with corresponding pinions $o^5$, affixed to the screws $o'$. The adjusting-screws for the upper rolls $d\ e\ f\ g$ are vertically arranged, while the adjusting-screws for the adjustable rolls $k$ and $k^2$ are horizontally arranged.

$p\ p$ represent heated rubbing-plates, which are arranged to bear upon both sides of the strip $c$ after it leaves the rolls $k^2\ k^2$. The said plates are preferably hollow chambers, having smooth surfaces in contact with the sides of the strip, each plate being heated by suitable means, such as by steam introduced through flexible inlet-pipes $p^2$, suitable flexible outlet-pipes $p^3$ being provided for the exhaust-steam. The said flexible pipes may communicate with any suitable source of supply of live steam and with any suitable receptacle for the exhaust-steam. The plates $p\ p$ are reciprocated while in contact with the strip $c$, so that they act to additionally force the filling composition into the fabric and to smoothen and burnish the surface of the strip. The means here shown for reciprocating the plates $p\ p$ comprise a lever $q$, mounted to oscillate on a stud $q'$, fixed to the frame of the machine, said lever having slots or openings above and below its center of oscillation, in which are located sliding boxes $q^3$. Said boxes receive trunnions $q^4\ q^4$, affixed to the rubbing-plates $p\ p$.

Figure 8:
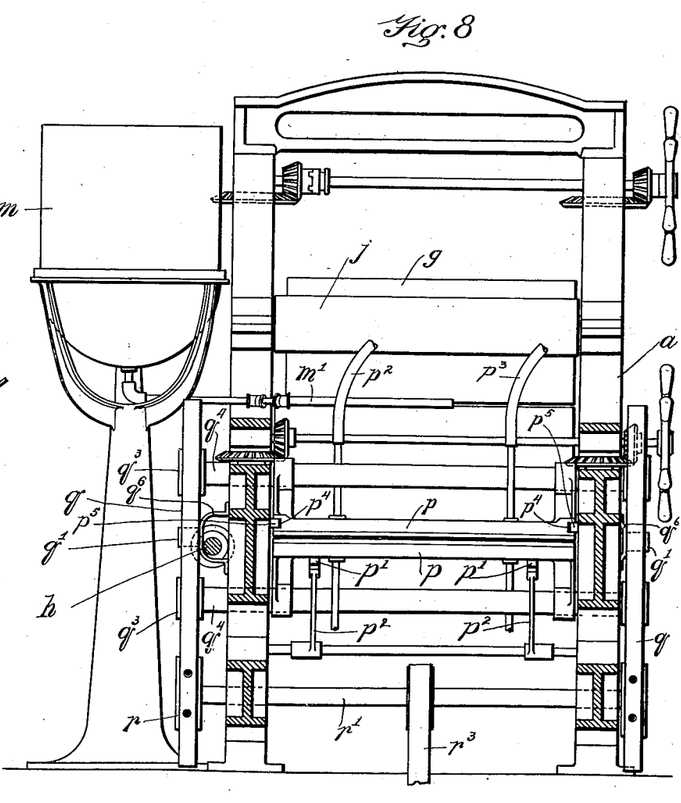
Fig. 8 represents a section on line 8 8 of Fig. 2.
Figure 9:
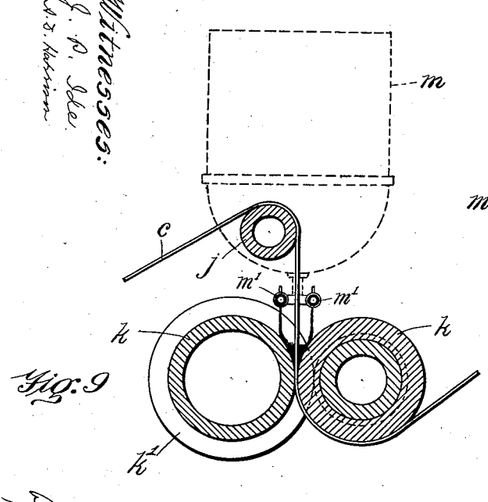
Fig. 9 represents a section on line 9 9 of Fig 1.
Figure 11:
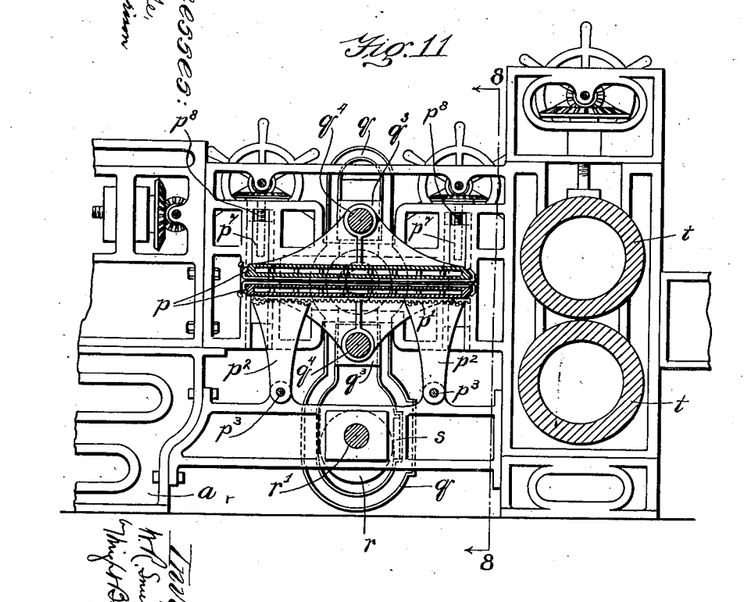
Fig. 11 represents an enlargement of a portion of Fig. 3.
Figure 12:
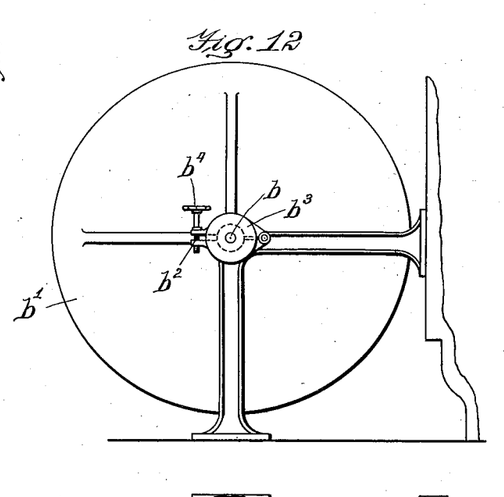
Figs. 12, 13, 14, 15, and 16 represent enlargements of portions of Figs. 1 and 2.
Figure 13:
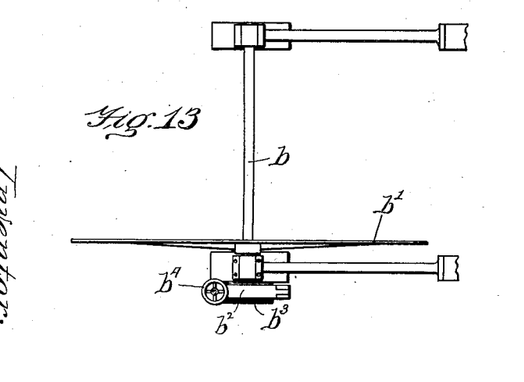
Figure 14:
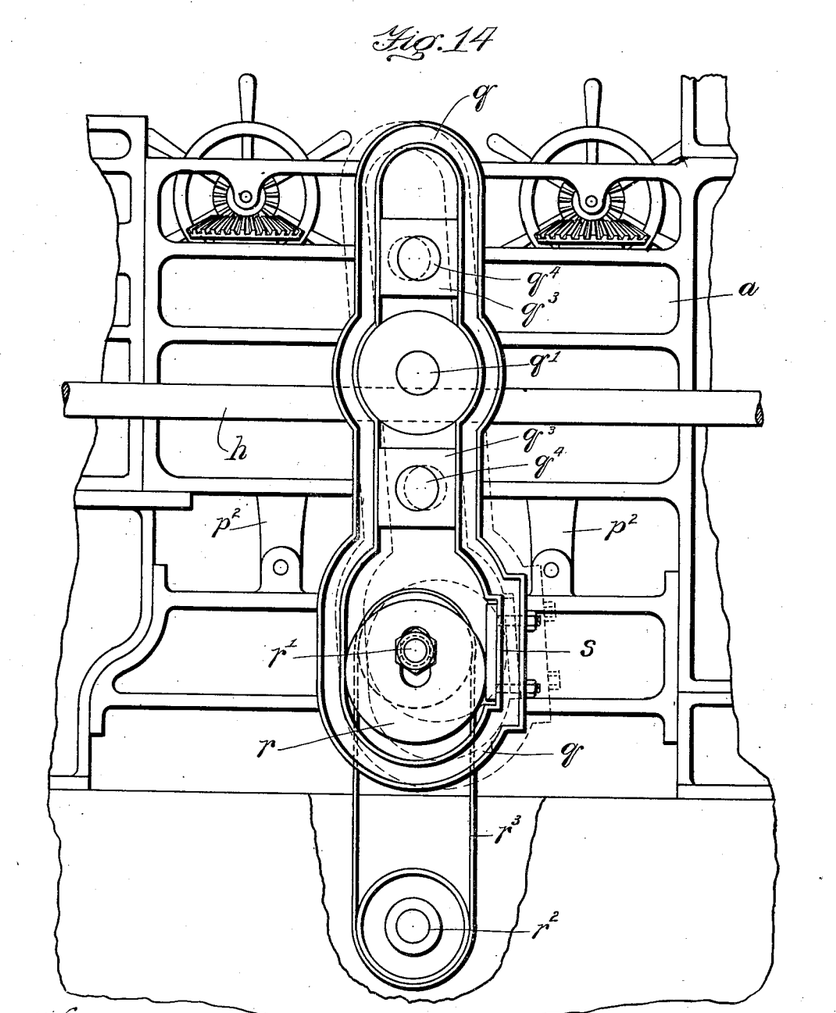
Figure 15:
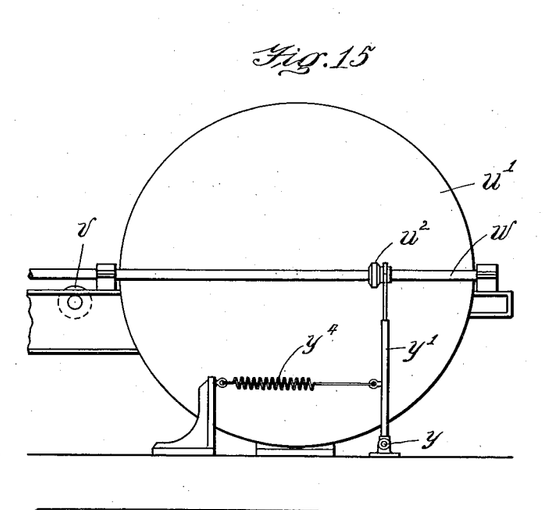
Figure 16:
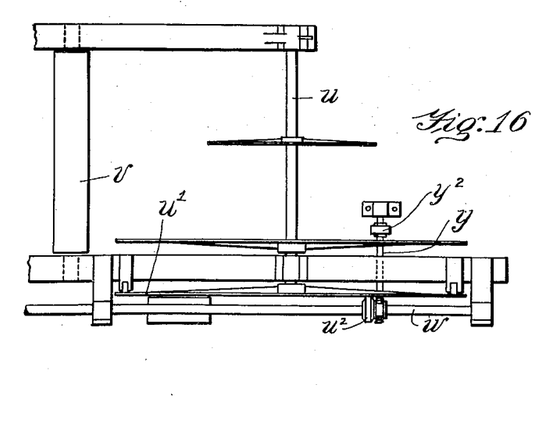

$r$ represents a disk eccentrically mounted upon a transverse shaft $r'$, journaled in bearings in the frame of the machine, the said eccentric disk being located in an enlarged opening in the lower portion of the lever $q$ and bearing upon the opposite sides of said opening. The shaft $r'$ is rotated by means of a driving-shaft $r^2$, having a pulley which is connected by a belt $r^3$ with a corresponding pulley on the shaft $r'$. The rotation of the shaft $r'$ causes the eccentric disk $r$ to oscillate the lever $q$, and thus reciprocate the rubbing-plates $p\ p$. The extent of the reciprocating motion thus imparted to the plates $p$ may be varied by means of an adjustable bearing-plate $s$, forming one side of the opening in which the disk $r$ rotates, and also by varying the eccentricity of the disk $r$, the latter being adjustable on the shaft $r'$ by means of a slot $r^4$ in the disk, which receives an end portion of the shaft $r'$. There are two of the levers $q$, one at each side of the machine, as indicated in Fig. 1. The lower rubbing-plate $p$ is provided on its under side with racks $p'$, Fig. 11, meshing with toothed segments formed on the upper ends of arms $p^2\ p^2$, pivoted at $p^3\ p^3$ to the supporting-frame. Said arms are oscillated by the movements of the lower plate and support the latter at a uniform height. The upper plate $p$ is provided at its ends with horizontal grooves $p^4$, Fig. 8, which engage studs or ribs $p^5$, affixed to vertically-adjustable slides $p^7$, Fig. 11, which are movable in vertical guides in the supporting-frame by adjusting-screws $p^8$. The upper plate $p$ is thus rendered adjustable toward and from the lower plate, so that the plates may be caused to exert the same pressure on a relatively thin strip $c$ as on a relatively thick strip. The studs $q'$, on which the levers $q$ oscillate, are supported by brackets $q^6$, Fig. 8, affixed to the supporting-frame, and are so located that the centers of oscillation of the levers are in substantially the same plane as the rubbing-surfaces of the plates $p$, while the trunnions $q^4\ q^4$ are located at opposite sides of said plane, so that the plates are moved simultaneously in opposite directions. It will be seen that the oscillatory segmental arms $p^2$ and the horizontal guides $p^5$ constitute a means for guiding the plates $p$ in parallel rectilinear paths or planes, the path of the upper plate being adjustable toward and from the path of the lower plate.

From the rubbing-plates $p$ the strip $c$ passes between a pair of rolls $t\ t$, which are preferably heated and driven like the rolls $d\ d$, &c., the surface velocity of the rolls $t\ t$ being preferably slightly greater than that of the rolls $k^2\ k^2$.

$u$ represents a winding roll or mandrel, which is arranged at the opposite end of the machine from the delivering-mandrel $b$ and receives the strip $c$ after the latter has passed between the rolls $tt$, the strip being guided to the winding-roll $u$ by an idle roll $v$. Means are employed for rotating the winding-roll $u$ at a speed governed by the diameter of the roll or accumulation of the fabric thereon, the speed decreasing as the diameter of the accumulation of fabric increases. To this end the roll $u$ is provided at one end with a disk $u'$, which constitutes one member of a friction driving-gear. The other member of said gear is a relatively small friction-wheel $u^2$, which is movable toward and from the center of rotation of the disk $u'$ and is in frictional contact with said disk. The roll $u^2$ is rotatively engaged with a shaft $w$, which is provided with a gear $w'$, meshing with a gear $w^2$, affixed to the shaft $h$, the disk $u^2$ being rotatively engaged with the shaft $w$, but adapted to be adjusted thereon.

$y$ represents a rock-shaft journaled in fixed bearings and having at one end a telescopic arm $y'$, the upper end of which is forked and engaged with a grooved collar fixed to the disk $u^2$.

$y^2$ represents an arm affixed to the rock-shaft $y$ at the opposite side of the disk $u'$, said arm $y^2$ being arranged to bear against the accumulation of fabric $c'$ on the winding-roll $u$ and to be moved outwardly thereby, thus turning the rock-shaft $y$ and causing a similar movement of the arm $y'$ and disk $u$. The arm $y^2$ is yieldingly held against the roll $c'$ of fabric by a spring $y^4$. The pipes $m'$, which deliver the composition to the troughs between the rolls $k k$ and $k^2 k^2$, are preferably provided with numerous outlets $m^2$. Each outlet has a valve formed as a sleeve $m^3$, rotatable on the pipe $m'$ and provided with an orifice $m^5$ and an ear or handle $m^4$. The said valves enable as many outlets to be provided as may be desired.

As shown in Fig. 10, one of the rolls $k$ is composed of a hub 2, having at one end a flange 13, its other end being screw-threaded and provided with an internally-threaded collar or nut 14. On the hub between the flanges 13 and 14 are assembled a series of rings 15, the peripheries of which collectively constitute the periphery of the roll. The nut 14 is separated from the adjacent ring 15 by a narrow spacing-ring 16, which forms the bottom of the groove, receiving one of the flanges $k'$ of the other roll $k$. This construction permits the distance between the flanges $k' k'$ to be adjusted to conform to the width of the strip $c$, the flange $k'$, which enters a groove between two of the rings 15, being adjustable lengthwise of the roll $k$, on which it is mounted. The other flange $k'$ is affixed by screws 17 to the roll, which supports it and overlaps the other side of the fixed flange 13. The rings 15 may vary in width, as shown. In Fig. 1 the flanges $k' k'$ are shown as adjusted to guide a relatively narrow strip $c$, while in Fig. 10 they are shown as adjusted to guide a much wider strip.

I have found that by maintaining the fabric in a stretched and heated condition while the composition (also in a heated condition) is being applied and forced into the pores of the fabric I am enabled to secure the uniform permeation of all parts of the fabric by the composition and that the fabric after the described treatment is free from all liability to contract, is unchanged by wear as to its structure and its capability of holding or adhering to a pulley, and is practically inextensible under any reasonable or ordinary strain, such as a machine-belt is liable to be subjected to. The improved fabric is therefore distinguished from multiple-ply woven fabric in its original condition or as it leaves the loom by the features above stated. The fabric is further characterized by the fact that its tensile strength is increased from three to five times.

The fabric when treated with a solution of unvulcanized rubber or its equivalent may be subjected to heat in a vulcanizing-press to vulcanize the rubber. Owing to the fact that a large part of the rubber is located within the pores of the fabric, the vulcanization does not require to be carried to such a state of hardness as would be required if the rubber were disposed in layers upon the surfaces and between the cloth layers of an ordinary cloth-and-rubber belt. The rubber may therefore be left in a relatively soft and adhesive condition, thus improving the frictional hold of the belt upon the pulleys.

The improved fabric and the method of making it, as above described, form the subject-matter of another application for Letters Patent of the United States, Serial No. 163,512, filed by me concurrently herewith.

I claim—

1. An apparatus of the character stated comprising instrumentalities for feeding and stretching a web of woven fabric, means for applying to the stretched portion of the web, a filling composition, and means for directly heating the stretched fabric prior to the application of said composition.

2. An apparatus of the character stated comprising instrumentalities for feeding, heating and stretching a web of woven fabric, means for applying to the stretched portion of the web, a filling composition, and means for heating said composition before its application to the fabric.

3. An apparatus of the character stated comprising instrumentalities for feeding and longitudinally stretching a web of woven fabric, means for applying to the stretched portion of the web a filling composition, and means for forcing said composition into the threads and crevices of the stretched portion of the fabric.

4. An apparatus of the character stated comprising a series of pairs of heated rolls, each pair having a greater surface velocity than the preceding pair, whereby a web of fabric passed between said rolls is simultaneously heated and stretched, a pair of heated rolls arranged side by side, so that the portions of their peripheries above the nip of the rolls constitute the sides of a trough, the stretched and heated web passing vertically through said trough and between the rolls, means for introducing a filling composition into said trough, and means for drawing the web from the trough-forming rolls.

5. An apparatus of the character stated comprising means for feeding and directly heating a web of woven fabric, means for applying a heated filling composition to the web, and means for applying rubbing pressure to the surfaces of the filled portion of the web.

6. An apparatus of the character stated comprising a series of pairs of heated rolls, each pair having a greater surface velocity than the preceding pair, whereby a web of fabric passed between said rolls is simultaneously heated and stretched, a pair of heated rolls arranged side by side, so that the portions of their peripheries above the nip of the rolls constitute the sides of a trough, the stretched and heated web passing vertically through said trough and between the rolls, means for introducing a filling composition into said trough, means for drawing the web from the trough-forming rolls, rubbing-plates arranged to act on the opposite sides of the web after it has passed the trough-forming rolls, and means for reciprocating said plates.

7. An apparatus of the character stated comprising a series of pairs of heated rolls, each pair having a greater surface velocity than the preceding pair, whereby a web of fabric, passed between said rolls is simultaneously heated and stretched, a pair of heated rolls arranged side by side, so that the portions of their peripheries above the nip of the rolls constitute the sides of a trough, the stretched and heated web passing vertically through said trough and between the rolls, means for introducing a filling composition into said trough, means for drawing the web from the trough-forming rolls, rubbing-plates arranged to act on the opposite sides of the web after it has passed the trough-forming rolls, means for reciprocating said plates, and means for heating said plates.

8. In an apparatus of the character stated comprising a pair of heated rolls arranged side by side so that portions of their peripheries above the nip of the rolls constitute the sides of a trough, one of the rolls having flanges and the other roll having end faces overlapped by the flanges, the latter constituting the ends of the trough.

9. In an apparatus of the character stated comprising a pair of heated rolls arranged side by side so that portions of their peripheries above the nip of the rolls constitute the sides of a trough, one of the rolls having a series of adjustable rings or sections constituting the acting surface of the roll, and means for securing said rings, the other roll having flanges, one of which is adjustable.

10. In an apparatus of the character stated comprising a pair of heated rolls arranged side by side so that portions of their peripheries above the nip of the rolls constitute the sides of a trough one of the rolls comprising a hub portion having a fixed flange, and adjustable collar or nut, and a series of removable rings interposed between said flange and nut, the other roll having flanges overlapping the said fixed flange and one of the rings.

11. In an apparatus of the character stated comprising the combination of a supporting-frame, a pair of rubbing-plates having opposed rubbing-surfaces arranged to act on a strip of fabric passed between the plates, means for reciprocating said plates edgewise and means for guiding the plates in parallel planes.

12. In an apparatus of the character stated comprising the combination of a supporting-frame, a pair of rubbing-plates having opposed rubbing-surfaces arranged to act on a strip of fabric passed between the plates, oscillatory levers pivoted to the frame, connections between the levers and the plates at opposite sides of the centers of oscillation of the levers, means for oscillating the levers, and means for guiding the plates in parallel planes.

13. In an apparatus of the character stated comprising the combination of a supporting-frame, a pair of rubbing-plates having opposed rubbing-surfaces arranged to act on a strip of fabric passed between the plates, means for reciprocating the plates edgewise, means for guiding the plates in parallel planes, and means for adjusting the path of one of the plates to vary the space between their acting faces.

14. In an apparatus of the character stated comprising the combination of a supporting-frame, a pair of rubbing-plates having opposed rubbing-surfaces arranged to act on a strip of fabric passed between the plates, means for reciprocating the plates edgewise, oscillatory segmental arms pivoted to the frame and supporting the lower plate, guides supported by the frame and engaging the upper plate, and means for adjusting said guides.

15. In an apparatus of the character stated comprising the combination of a pair of heated rolls arranged side by side so that portions of their peripheries above the nip of the rolls constitute the sides of a trough, a kettle or reservoir elevated above the trough, and a pair of feed-pipes extending from the reservoir over said trough.

16. In an apparatus of the character stated comprising the combination of a pair of heated rolls arranged side by side so that portions of their peripheries above the nip of the rolls constitute the sides of a trough, a kettle or reservoir elevated above the trough, and a pair of feed-pipes extending from the reservoir over said trough, each pipe having a plurality of outlets and independent valves controlling said outlets.

17. In an apparatus of the character stated comprising means for feeding and longitudinally stretching a web of woven fabric, means for applying a filling composition thereto, a delivering-roll having a frictional retarding device or brake, a winding-roll, and means governed by the accumulation of fabric on the winding-roll for rotating the latter at a continuously-decreasing speed.

In testimony whereof I have affixed my signature in presence of two witnesses.

WILLIAM R. SMITH.

Witnesses:
 THOS. H. NOONAN,
 J. E. VOORHIS.